United States Patent [19]

Jaccod et al.

[11] Patent Number: 4,617,005
[45] Date of Patent: Oct. 14, 1986

[54] SPEED CHANGE PULLEY WITH DIAPHRAGM SPRING AND OIL SPRING

[75] Inventors: Michel Jaccod, Champigny-sur-Marne; Jacques T. de Briel, Levallois Perret, both of France

[73] Assignee: Valeo, Paris, France

[21] Appl. No.: 719,488

[22] Filed: Apr. 3, 1985

[30] Foreign Application Priority Data

Apr. 6, 1984 [FR] France .................. 8405518

[51] Int. Cl.⁴ .......................... F16H 11/06
[52] U.S. Cl. ........................ 474/14; 474/13
[58] Field of Search ..................... 474/11–16, 474/28, 43, 46

[56] References Cited

U.S. PATENT DOCUMENTS 4,132,120 1/1979 Fénart ..................... 474/13
4,178,808 12/1979 Bacher .................... 474/13
4,432,743 2/1984 Pitoiset ................... 474/14

FOREIGN PATENT DOCUMENTS 2347578 11/1977 France .
2492031 4/1982 France .
2109490 6/1983 United Kingdom .

Primary Examiner—James A. Leppink
Assistant Examiner—Thuy M. Bui
Attorney, Agent, or Firm—Charles E. Brown; Charles A. Brown

[57] ABSTRACT

A speed change device comprises a hub, two annular pulley sides disposed around the hub and facing each other, one of the pulley sides being mounted for axial movement on the hub against the bias of a diaphragm spring and an additional coil spring. The diaphragm spring has a peripheral portion rockably axially bearing against the one pulley side and a central portion having a plurality of radial fingers separated by slots, rockably axially bearing against an abutment member fixed axially relative to the hub. The additional coil spring is disposed around the hub, and bears against a shoulder fixed axially relative to the movable pulley side and against the abutment member through a central portion of the diaphragm spring. An elastic spacer is axially interposed between the coil spring and the diaphragm spring. Another spacer of elastic material is axially interposed between the diaphragm spring and the abutment member. The elastic spacers are united with each other through the central opening and the slots between the radial fingers.

18 Claims, 1 Drawing Figure

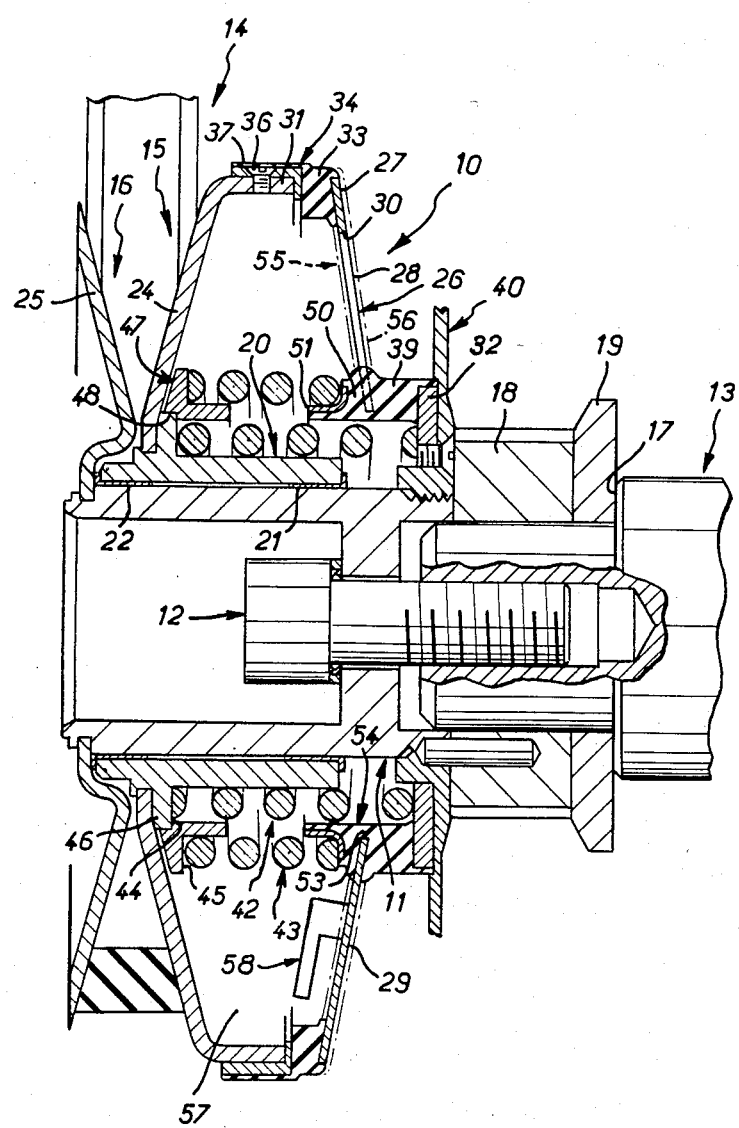

SPEED CHANGE PULLEY WITH DIAPHRAGM SPRING AND OIL SPRING

FIELD OF THE INVENTION

The present invention relates generally to speed change devices for use in transmitting rotational motion from a motor, such as in motor vehicle, for driving an accessory such an alternator, water pump, compressor or fan usually equipping such vehicle.

BACKGROUND OF THE INVENTION

As is known such a speed change device generally comprises a driving pulley, a driven pulley and an endless transmission belt looped over the pulleys. Each of the pulleys comprises a hub, two annular plates or pulley sides facing each other and disposed around the associated hub. At least one of the pulley sides is called a movable pulley side is axially movably mounted on the associated hub under the bias of axially acting resilient return means.

The present invention is more particularly directed to the case in which such axially acting resilient return means includes an annular diaphragm spring which rockably axially bears at its outer periphery against the movable pulley side and rockably axially bears through radial fingers spaced by slots in the central portion of the diaphragm spring, against an abutment member axially fixed relative to the hub.

Such a speed change device is disclosed in U.S. Pat. No. 4,132,120 and in copending application U.S. Ser. No. 610,512 filed May 15, 1984, now U.S. Pat. No. 4,573,948 and assigned to the assignees of the instant application.

In practice the movable pulley side of the driving and driven pulleys are mutually displaceable between advanced and retracted endmost positions. When the movable plate of the driving pulley is in its advanced position the movable pulley of the driven pulley is in its retracted position and vice versa, and for each of the positions of the movable pulley side the belt has a predetermined position which corresponds to the transmission ratio. For example, in the rest position the movable pulley side of the driving pulley may be in the advanced position and the movable pulley side of the driven pulley will be in the retracted position, the transmission ratio will then be at its highest. Conversely, in operation, if under the action of suitable control means the movable side of the driving pulley is displaced from its advanced position to its retracted positon the movable side of the driven pulley is displaced in the opposite direction from its retracted position to its advanced position, the transmission ratio will be reduced accordingly.

In any event, as regards the driving pulley the movable side is constantly urged toward the advanced position by the associated axially acting resilient return means and the resilient return means returns the movable side from its retracted position to its advanced position.

It has been established that at least in such applications the diaphragm spring usually employed is inadequate to satisfactorily return the movable side of the pulley. It has been proposed to add additional resilient means comprising one or more coil springs coaxially disposed with respect to each other bearing against a shoulder axially fixed to the movable side.

Whereas an axially bearing surface for the radially inner coil spring may be relatively easily found directly on the abutment member through the central opening in the diaphragm spring such is not the case for the radially outer coil spring unless the central opening in the diaphragm spring is enlarged which for a given diameter of the diaphragm spring would reduce the effective size of the diaphragm spring to the detriment of its operating characteristics.

It therefore was contemplated to have the radially outer coil spring bear against an annulus disposed on the side of the diapharagm spring remote from the abutment member and fixed axially relative to the abutment member by means of a sleeve extending axially through the central opening of the diaphragm spring at the expense of a considerable complication of the device or have the radially outer coil spring bear against the abutment member through the diaphragm spring itself, and more particularly the central portion of the diaphragm spring.

But aside from the fact that the radially outer coil spring is not well seated, such an arrangement brings a first metal part, i.e., the diaphragm spring, in contact with another metal part with respect to which it is relatively movable, namely rocking movement, thereby producing friction and wear between the metal parts and at the same time a risk of binding by fusion welding the metal parts together and a risk of throwing the outer coil spring off center.

OBJECT AND SUMMARY OF THE INVENTION

A general object of the present invention is to provide an arrangement which mitigates against or eliminates the foregoing drawbacks and has other advantages.

According to the invention there is provided a speed change device comprising a pulley including a hub, and two pulley sides disposed around the hub and facing each other. One of the pulley sides is axially movably mounted against the bias of axially acting resilient means which includes a diaphragm spring. The diaphragm spring has a peripheral portion rockingly axially bearing against the movable pulley side and a central portion rockingly axially bearing against an abutment member axially fixed relative to the hub. Such a variable speed drive comprises the improvement wherein the axially acting resilient means further comprises about the hub an auxiliary coil spring bearing against a shoulder fixed axially relative to the movable pulley side, and axially against the abutment member through the central portion of the diaphragm spring, an elastic spacer being axially interposed between the coil spring and the diaphragm spring.

Owing to the elastic spacer which preferably is circularly continuous along the surface of the central portion of the diaphragm spring and bonded thereto and a metal cup for contact with the coil spring, all wear and any risk of binding between the coil spring and the diaphragm spring are precluded.

Further, the elastic spacer advantageously cooperates, according to the arrangement disclosed in the aforesaid copending U.S. Ser. No. 610,512, incorporated herein by reference, with another elastic spacer axially interposed between the diaphragm spring and the abutment member. The two elastic spacers employed are then preferably arranged in continuity or united with each other, through the central opening of the diaphragm spring and through the slots in the central portion of the diaphragm spring. The resulting elastic spacer component thus encapsulates the ends of the radial fingers of the diaphragm, in other words the ends of the radial fingers are embedded in the elastic spacer component.

BRIEF DESCRIPTION OF THE DRAWINGS

These and other features of the invention will be brought out in the description which follows, given by way of example, with reference to the accompanying diagrammatic drawing.

The sole figure illustrates in longitudinal section a pulley of a speed change device embodying the present invention.

DESCRIPTION OF THE PREFERRED EMBODIMENT

In the drawing is shown a driving pulley 10 by way of example. It will be readily appreciated that it could be a driven pulley. In any event the pulley 10 generally comprises, as is conventional, a hub 11, which as illustrated is rigidly fixed for rotation with a driving shaft 13 by means of a threaded fastener 12 threadedly engaged with the end of the shaft 13. Two annular pulley sides 16 facing each other guide a V-belt 14 looped over the driving pulley and the driven pulley (not shown). At least one of the pulleys sides 15, 16, here pulley side 15, is mounted for axial movement with respect to the hub 11 and referred hereinafter as the movable pulley side or plate.

As illustrated, the hub 11 bears axially against a transverse shoulder 17 of the driving shaft 13 in succession through a rigid annular spacer 18, having gear teeth at its outer periphery, and a radial flange 19.

The movable pulley side 15 is secured, as illustrated, for example by crimping, on a sleeve 20 and thereby it is slidably mounted on the hub with play or through bearings 21, 22 disposed at the respective ends of the sleeve 20.

The other pulley side 16 associated with movable pulley side 15 will be referred to as the fixed pulley side is axially and rotationally (or circumferentially) fixed to the hub; for example, it may be crimped at its inner periphery to the end of the hub 11, as illustrated.

The pulley sides 15, 16 has facing frustoconical surfaces having opposite but equal half angles, the V-belt 14 having a corresponding trapezoidal cross section.

The foregoing features of the pulley are well known per se and need not be described in greater detail herein.

Likewise as known per se, the movable pulley side 15 is biased constantly toward the fixed pulley side 16 by axially acting resilient means including a diaphragm spring 26 comprising a circularly continuous outer peripheral portion 27 which rockingly axially bears against the movable pulley side 15 and more particularly the edge of the outer rim 31 of the movable pulley side 15 extending away from the fixed pulley side 16. The central portion 28 of the diaphragm spring has radial fingers 29 alternating circumferentially with slots 30. The central portion rockingly axially bears against an abutment member 32 axially fixed relative to the hub 11.

In practice, in the illustrated embodiment the diaphragm spring 26 rockingly axially bears against the movable pulley side 15 through an annular spacer 33 of elastic material. The annular resilient spacer 33 is bonded (i.e. adhesive bonded or vulcanized) to the outer peripheral part 27 of the diaphragm spring 26 and an auxiliary part or component 34 of L-shaped cross section engaged with the axial rim 31 of the movable pulley side 15 and fixed thereto at circumferentially spaced locations by screws 36 of which one is shown.

In the illustrated embodiment the annular elastic spacer 33 is axially interposed between the outer peripheral portion 27 of the diaphragm spring 26 and the movable pulley side 15 extends axially along an axial portion of the auxiliary part 34 forming a film or thin layer 37 on the surface thereon.

Furthermore, in the illustrated embodiment the annular elastic spacer 39 is also interposed axially between the diaphragm spring 26 and the abutment member 32.

In practice in the illustrated embodiment the abutment member 32 which is a plain washer is fixed to the stop ring 40 by screws (only one illustrated).

The abutment member 32 is therefore fixed axially to the hub 11 through a stop ring 40.

In addition, in the illustrated embodiment the annular elastic spacer 39 is bonded (i.e. adhesive bonded or vulcanized) to the abutment member 32 and to the diaphragm spring 26 and more specifically to the free ends of the radial fingers 29 thereof.

The axially acting resilient return means associated with the movable pulley side 15 further comprises around the hub as auxiliary axially acting resilient return means, two coaxial coil springs 42, 43 which bear axially against the abutment member 32 as described in detail hereinafter and against a shoulder 44, 45 fixed axially with respect to the movable pulley side 15.

The radially inner coil spring 42 has a shoulder 44 formed by one of the faces of a radial flange 46 radially outwardly protruding from the outer periphery of the sleeve 20 and another face which bears against the movable pulley side 15.

As for the radially outer coil spring 43 the shoulder 45 is part of auxiliary part 47 of L-shaped cross section and is engaged through a recess 48 on the edge of the flange 46 of the sleeve 20, the auxiliary part 47 being coaxial with the sleeve 20 and in axial abutment thereagainst.

At its other end the inner coil spring 42 bears axially against the abutment member 32 associated with the elastic spacer 39.

According to the invention, the radially outer coil spring 43 bears axially through the diaphragm spring 26 (and more particularly through the central portion 28 thereof) against the abutment member 32 and another elastic spacer 50 is axially interposed between the outer coil spring 43 and the diaphragm spring 26.

Preferably, as shown, the other resilient spacer is circularly continuous along the surface of the diaphragm spring 26 and the ends of the radial fingers 29 thereof, and a metal cup 51 is axially interposed between the other elastic spacer 50 and the outer coil spring 43 for engaging the end of the coil spring 43.

The other elastic spacer 50 is bonded (i.e. adhesive bonded or vulcanized) to the diaphragm spring 26 and to the metal annulus 51. The metal annulus 51 also has a generally L-shaped cross section with a large radius connecting zone for suitably accommodating the adjacent end of the outer coil spring 43.

Preferably, as shown, the elastic spacers 39, 50 which are substantially at the same radial location, one on each side of the diaphragm spring 26 are in continuity or united with each other through the central opening 53 in the diaphragm spring as well as through the slots 30, the resulting elastic spacer component has the free ends of the radial fingers 29 of the diaphragm spring embedded therein.

When the diaphragm spring 26 has a film or coating 55 of elastic material on at least that surface facing the movable pulley side 15 as illustrated in phantom lines in the drawing in order to form a fluidtight chamber 57 the elastic material coating advantageously extends continuously from the elastic material spacer 33 to the elastic material spacer 50 and in one piece therewith.

Likewise, as illustrated in phantom lines in the drawing, the diaphragm spring 26 may have on its surface remote from the movable pulley side 15, a coating or film 56 of elastic material extending continuously from the elastic material spacer 33 axially to the elastic material spacer 39, and in one piece therewith.

Finally, as is known per se, in the illustrated embodiment, as illustrated in the drawing for one of the radial fingers, each of the radial fingers 26 carries a small weight member 58 facing the movable pulley side 15 which is sensitive to centrifugal force for controlling the load of the diaphragm spring as a function of the rotational speed of the speed change device.

In any event the coil springs 42, 43 add their effect to the diaphragm spring 26 to return the movable pulley side 15 toward the fixed pulley side 16.

Of course, the scope of the present invention is not limited to the embodiment illustrated and described herein but encompasses various modifications and alternatives understood to those skilled in the art.

For example, the axial portion of at least the auxiliary part 47 may be formed in one piece with the sleeve 20 optionally with direct axial contact of the outer coil spring against the movable pulley side 15.

What we claim is:

1. A speed change pulley comprising a hub, two annular pulley sides disposed around the hub and facing each other, one of said pulley sides being mounted for axial movement on said hub against the bias of axially acting resilient means including a diaphragm spring, said diaphragm spring including a peripheral portion rockably axially bearing against said one pulley side, and a central portion having a plurality of radial fingers separated by slots, said central portion rockably axially bearing against an abutment member fixed axially relative to said hub, said axially acting resilient means further comprising an additional coil spring disposed around the hub and bearing against a shoulder fixed axially relative to the movable pulley side and bearing said diaphragm spring, and a spacer of elastic material being axially interposed between said coil spring and said diaphragm spring.

2. The speed change pulley of claim 1, wherein said elastic spacer extends circularly continuously on the surface of the central portion of said diaphragm spring.

3. The speed change pulley of claim 1, wherein said elastic spacer is bonded to the central portion of said diaphragm spring.

4. The speed change pulley according to claim 1, wherein a metal annulus is interposed between said coil spring and said elastic spacer.

5. The speed change pulley of claim 4, wherein said elastic spacer is bonded to said annulus.

6. The speed change pulley of claim 1, wherein another spacer of elastic meterial is axially interposed between said diaphragm spring and said abutment member, the first mentioned elastic spacer and said other elastic spacer are in continuity with each other through the central opening defined by the radially inner ends of said radial fingers.

7. The speed change pulley according to claim 6, wherein said first-mentioned spacer and said other spacer are united through said central openings and said slots between said radial fingers so that the radially inner ends of said radial fingers are embedded in the resulting elastic spacer component.

8. The speed change pulley according to claim 1, wherein another elastic spacer is axially interposed between the outer peripheral portion of said diaphragm spring and said movable pulley side, said said diaphragm spring having a coating of elastic material on its surface facing axially toward the movable pulley side, said elastic coating extending continuously from said other elastic spacer interposed between said diaphragm spring and said movable pulley side to said first-mentioned elastic spacer interposed between said diaphragm spring and said coil spring, and being united with both of said elastic spacers.

9. The speed change pulley according to claim 1, wherein the shoulder against which said coil spring bears is part of an auxiliary part, said auxiliary part having a generally L-shaped cross section and a recess engaged on the edge of a radial flange protruding from the outer periphery of a sleeve carrying said movable pulley side axially of said hub.

10. A speed change pulley comprising a hub, two annular pulley sides disposed around said hub and facing each other, one of said pulley sides being mounted for axial movement on said hub against the bias of axially acting resilient means including a diaphragm spring, said diaphragm spring including a peripheral portion rockably axially bearing against said one pulley side and a central portion having a plurality of radial fingers separated by slots, an abutment member fixed axially relative to said hub, said central portion rockably axially bearing against said abutment member, said axially acting resilient means further comprising inner and outer coaxial coil springs disposed around said hub, a shoulder fixed axially relative to said movable pulley side, each of said coil springs bearing against said shoulder, said inner coil spring bearing directly against said abutment member, and said outer coil spring bearing against said abutment member through the central portion of said diaphragm spring, and a spacer of elastic material being axially interposed between said outer coil spring and said diaphragm spring.

11. The speed change pulley of claim 10, wherein said elastic spacer extends circularly continuously on the surface of the central portion of said diaphragm spring.

12. The speed change pulley of claim 10, wherein said elastic spacer is bonded to the central portion of said diaphragm spring.

13. The speed change pulley according to claim 10, wherein a metal annulus is interposed between said outer coil spring and said elastic spacer.

14. The speed change pulley of claim 13, wherein said elastic spacer is bonded to said annulus.

15. The speed change pulley of claim 10, wherein another spacer of elastic material is axially interposed between said diaphragm spring and said abutment member, and the first-mentioned elastic spacer and said other elastic spacer are in continuity with each other through a central opening defined radially inner ends of said radial fingers.

16. The speed change pulley according to claim 15, wherein said first-mentioned spacer and said other spacer are united through said central opening and said slots between said radial fingers so that the radially inner ends of said radial fingers are embedded in a resulting elastic spacer component formed of said spacers.

17. The speed change pulley according to claim 10, wherein another elastic spacer is axially interposed between an outer peripheral portion of said diaphragm spring and said movable pulley side, and said diaphragm spring having a coating of elastic material on its surface facing axially toward said movable pulley side, said elastic coating extending continuously from said other elastic spacer interposed between said diaphragm spring and said movable pulley side to the first-mentioned elastic spacer interposed between said diaphragm spring and said outer coil spring, and said elastic coating being united with both of said elastic spacers.

18. The speed change pulley according to claim 10, wherein there is a sleeve carrying said movable pulley side for said axial movement on said hub, said shoulder against which said inner coil spring bears comprises a radial flange protruding from an outer periphery of said sleeve, and the shoulder against which said outer coil spring bears is formed on an auxiliary part, said auxiliary part having a generally L-shaped cross section and a recess engaged on an edge of said radial flange protruding from said sleeve.

* * * * *